(12) United States Patent
Shi (10) Patent No.: US 11,910,930 B2
(45) Date of Patent: Feb. 27, 2024

(54) AIRBED WITH AIR PUMP

(71) Applicant: DONGGUAN HONGYU PLASTIC RUBBER CO.,LTD., Dongguan (CN)

(72) Inventor: Juying Shi, Nanchong (CN)

(73) Assignee: DONGGUAN HONGYU PLASTIC RUBBER CO., LTD., Dongguan (CN)

( * ) Notice: Subject to any disclaimer, the term of this patent is extended or adjusted under 35 U.S.C. 154(b) by 124 days.

(21) Appl. No.: 17/647,844

(22) Filed: Jan. 12, 2022

(65) Prior Publication Data
US 2023/0218091 A1 Jul. 13, 2023

(51) Int. Cl.
*A47C 27/10* (2006.01)
*F16K 31/53* (2006.01)

(52) U.S. Cl.
CPC ............. *A47C 27/10* (2013.01); *F16K 31/53* (2013.01)

(58) Field of Classification Search
CPC ..... A47C 27/08; A47C 27/081; A47C 27/082; A47C 27/083; A47C 27/084; A47C 27/10; F16K 31/53
See application file for complete search history.

(56) References Cited

U.S. PATENT DOCUMENTS

| 4,829,616 A * | 5/1989 | Walker ................. | F04D 25/084 251/129.05 |
| 7,089,618 B1 * | 8/2006 | Metzger ............... | A47C 27/087 5/709 |
| 11,503,920 B1 * | 11/2022 | Shi ........................ | A47C 27/10 |
| 2003/0200610 A1 * | 10/2003 | Wang .................... | A47C 27/10 5/710 |
| 2006/0265810 A1 * | 11/2006 | Wu ....................... | A47C 27/081 5/712 |
| 2010/0014993 A1 * | 1/2010 | Wang .................... | F04D 25/084 5/713 |
| 2010/0278659 A1 * | 11/2010 | Wang .................... | F04B 49/022 417/43 |
| 2014/0013514 A1 * | 1/2014 | Misaki .................. | A47C 27/10 5/710 |
| 2016/0199248 A1 * | 7/2016 | Jackson ................ | A47C 7/024 601/134 |
| 2016/0215780 A1 * | 7/2016 | Liu ........................ | F04D 29/503 |

(Continued)

FOREIGN PATENT DOCUMENTS

CN 212546347 U 2/2021

*Primary Examiner* — Justin C Mikowski
*Assistant Examiner* — George Sun
(74) *Attorney, Agent, or Firm* — Bayramoglu Law Offices LLC (57) ABSTRACT

An airbed with an air pump is provided. A main inflatable cavity is arranged inside an airbed body of the airbed, the top edge of the main inflatable cavity is surrounded by an upper inflatable cavity, and the bottom edge of the main inflatable cavity is surrounded by a lower inflatable cavity. The main inflatable cavity, the upper inflatable cavity and the lower inflatable cavity are isolated from each other. After the upper inflatable cavity and the lower inflatable cavity are completely filled, the upper and lower edges of the main inflatable cavity can be propped up, so that the whole airbed has a stable shape and excellent support. In addition, since the three set inflatable cavities are independent of each other, the other two inflatable cavities can still play a supporting role even if one of the three inflatable cavities is damaged and leaking.

6 Claims, 6 Drawing Sheets

(56) References Cited

U.S. PATENT DOCUMENTS

| | | | |
|---|---|---|---|
| 2016/0242562 A1* | 8/2016 | Karschnik | A47C 27/082 |
| 2017/0196368 A1* | 7/2017 | Liu | A47C 27/16 |
| 2019/0211829 A1* | 7/2019 | Huang | F04D 25/166 |
| 2020/0386237 A1* | 12/2020 | Huang | F04D 25/08 |
| 2020/0400149 A1* | 12/2020 | Huang | F04D 29/601 |
| 2021/0169232 A1* | 6/2021 | Hou | A47C 27/087 |
| 2021/0259434 A1* | 8/2021 | Wang | A47C 27/10 |
| 2022/0287475 A1* | 9/2022 | Shi | A47C 27/087 |

\* cited by examiner

AIRBED WITH AIR PUMP

TECHNICAL FIELD

The present invention belongs to the technical field of an airbed, and more particularly, relates to an airbed with an air pump.

BACKGROUND

The airbed has the advantages of becoming compact in size and lightweight after air is discharged, which is convenient for carrying after being folded. The size of the airbed after being inflated is similar to that of the general household bed, and the weight is also singularly light, which is convenient for arrangements. For the people who work outside and move frequently, the airbed can not only reduce the burden of moving but also save space in the bedroom. In addition, airbeds can be used temporarily for resting, napping, and the like after traveling, camping, swimming, work, or exercise.

Presently, the airbed on the market is generally inflated by an additionally arranged air pump, which is inconvenient in use.

In the prior art, the Chinese patent No. CN212546347U discloses an airbed with a built-in air pump. The airbed with the built-in air pump has an inflatable function, which improves the inflating efficiency, but still has the following shortcomings: firstly, the airbed needs to be equipped with a special air discharge valve, so that in addition to the port communicated with the air pump, the port communicated with the air discharge valve is required to be arranged on the airbed, which increases the risk of air leakage; secondly, only one inflatable cavity is arranged in the airbed, so that the load-bearing capacity is poor, and the airbed cannot continue to be used once the air leakage occurs.

SUMMARY

An objective of the present invention is to provide an airbed with an air pump, to solve the technical problems that the airbed in the prior art needs to be separately provided with an inflating port and a deflating port, having a high risk of air leakage.

In order to solve the above technical problems, the present invention adopts the following technical solutions.

An airbed with an air pump includes an airbed body and an air pump arranged on a side of the airbed body. A main inflatable cavity is arranged inside the airbed body, the top edge of the main inflatable cavity is surrounded by an upper inflatable cavity, and the bottom edge of the main inflatable cavity is surrounded by a lower inflatable cavity. The main inflatable cavity, the upper inflatable cavity and the lower inflatable cavity are isolated from each other.

A first valve and a second valve are arranged in the air pump, the first valve can be communicated with the main inflatable cavity, and the second valve is communicated with the upper inflatable cavity and the lower inflatable cavity respectively through an inflatable pipe. The first valve and the second valve can be switched to an inflating position, a sealing position and an air discharge position, respectively. The air pump is provided with a switching mechanism configured to control the first valve and the second valve to be switched between the inflating position, the sealing position and the air discharge position. In the inflating position, the first valve and the second valve are opened. In the sealing position, the first valve and the second valve are closed. In the air discharge position, the first valve and the second valve are opened.

Preferably, the air pump includes a housing. A motor chamber, an inflation chamber, a valve chamber and a ventilation chamber are formed inside the housing and isolated from each other. The inflation chamber is divided into a front inflation chamber and a back inflation chamber. A first communication hole is arranged between the front inflation chamber and the back inflation chamber.

A motor and a blade are arranged in the motor chamber and the back inflation chamber, respectively, and the motor is drivingly connected to the blade. The first valve and the second valve are arranged in the valve chamber.

A channel-switching slide block is arranged in the ventilation chamber, and a slide rail is arranged in the housing. The channel-switching slide block is provided with a slide groove matched with the slide rail, and the channel-switching slide block can be driven to move along the slide rail when the switching mechanism adjusts the first valve and the second valve.

The front inflation chamber and the back inflation chamber are respectively provided with a first ventilation port and a second ventilation port communicated with the ventilation chamber, and the valve chamber is provided with a third ventilation port.

The channel-switching slide block is provided with a ventilation groove, and the ventilation groove is provided with a front opening and a top opening. When the first valve and the second valve are in the inflating position, the front opening is communicated with the third ventilation port and the top opening is communicated with the first ventilation port. When the first valve and the second valve are in the air discharge position, the front opening is communicated with the third ventilation port and the top opening is communicated with the second ventilation port.

Preferably, the switching mechanism includes a first gear and a second gear arranged coaxially, a third gear engaged with the first gear, and a fourth gear engaged with the second gear. A knob is arranged outside the housing to drive the first gear and the second gear to rotate, so that the third gear and the fourth gear can drive the first valve and the second valve to operate, respectively.

A first dial tooth and a second dial tooth are arranged at an interval at the back side of the first gear or/and the back side of the second gear. The bottom of the channel-switching slide block is provided with an upright rod portion located between the first dial tooth and the second dial tooth.

Preferably, the first valve includes a base and a top plate, and the top of the top plate is provided with a valve plate. The valve chamber is provided with a fourth ventilation port corresponding to the valve plate, a guide groove matched with the top plate is arranged in the housing, and a compressed spring is arranged between the top plate and the guide groove. A connecting shaft connected to the center of the third gear is arranged under the base. The upper side of the base is provided with a V-shaped groove, and the lower end of the top plate is located in the V-shaped groove.

Preferably, a structure of the second valve is identical to a structure of the first valve.

Preferably, the inflation chamber is located at the front side of the motor chamber. The ventilation chamber includes a lower ventilation chamber located below the motor chamber and the inflation chamber, and a back ventilation chamber located at the back side of the motor chamber. The valve chamber is located at front sides of the lower ventilation chamber and the inflation chamber. The bottom of the back ventilation chamber is provided with a fifth ventilation port. A sixth ventilation port is arranged between the back ventilation chamber and the motor chamber. A seventh ventilation port is arranged between the motor chamber and the lower ventilation chamber.

Preferably, the housing includes an upper cover, a bottom plate is arranged at the bottom of the upper cover, and an annular surrounding film is arranged along the periphery of the bottom of the upper cover.

An isolation frame is arranged in the upper cover, the isolation frame includes an isolation groove, and a first isolation plate is arranged in the isolation groove. The motor chamber and the inflation chamber are located at front and back sides of the first isolation plate, respectively.

The front portion and the back portion of the isolation groove are provided with a first splicing plate and a second splicing plate, respectively, and front and back tops in the upper cover are integrally provided with a third splicing plate and a fourth splicing plate, respectively. The first splicing plate and the third splicing plate are aligned and attached to form a second isolation plate, and the second splicing plate and the fourth splicing plate are aligned and attached to form a third isolation plate.

The inflation chamber is divided by the second isolation plate into the front inflation chamber and the back inflation chamber.

The back ventilation chamber is located at the back side of the third isolation plate, and the lower ventilation chamber is located at the lower side of the isolation groove.

The front portion of the isolation groove is integrally provided with an L-shaped holding plate, and the L-shaped holding plate is provided with an installation seat for installing the first valve and the second valve.

Compared with the prior art, the advantages of the present invention are as follows:

1. The main inflatable cavity is arranged inside the airbed body of the airbed with the air pump, the top edge of the main inflatable cavity is surrounded by the upper inflatable cavity, and the bottom edge of the main inflatable cavity is surrounded by the lower inflatable cavity. The main inflatable cavity, the upper inflatable cavity and the lower inflatable cavity are isolated from each other. After the upper inflatable cavity and the lower inflatable cavity are fully filled, the upper and lower edges of the main inflatable cavity can be propped up, so that the whole airbed has a stable shape and excellent support. In addition, since the three set inflatable cavities are independent of each other, the other two inflatable cavities can still play a supporting role even if one of the three inflatable cavities is damaged and leaking.

2. The air pump on a side of the airbed body is provided with a first valve and a second valve, and the first valve and the second valve can be switched to the inflating position, the sealing position and the air discharge position, respectively. Thus, the main inflatable cavity, the upper inflatable cavity and the lower inflatable cavity can be inflated and deflated by controlling the first valve and the second valve, which avoids an additional design of an air discharge valve, and reduces ports on the airbed and the risk of air leakage.

BRIEF DESCRIPTION OF THE DRAWINGS

The drawings are used to provide further understanding of the present invention, form part of the specification, and are used to explain the present invention together with embodiments of the present invention, which does not constitute limitations to the present invention. In the drawings.

DETAILED DESCRIPTION OF THE EMBODIMENTS

Technical solutions of the embodiments of the present invention are clearly and completely described below with reference to the drawings of embodiments of the present invention Obviously, the described embodiments are only a part, not all, of the embodiments of the present invention. Based on the embodiments of the present invention, all other embodiments obtained by those skilled in the art without creative effort shall fall within the scope of protection of the present invention.

Referring to FIGS. 1 to 10, an airbed with an air pump is provided.

Figure 1:
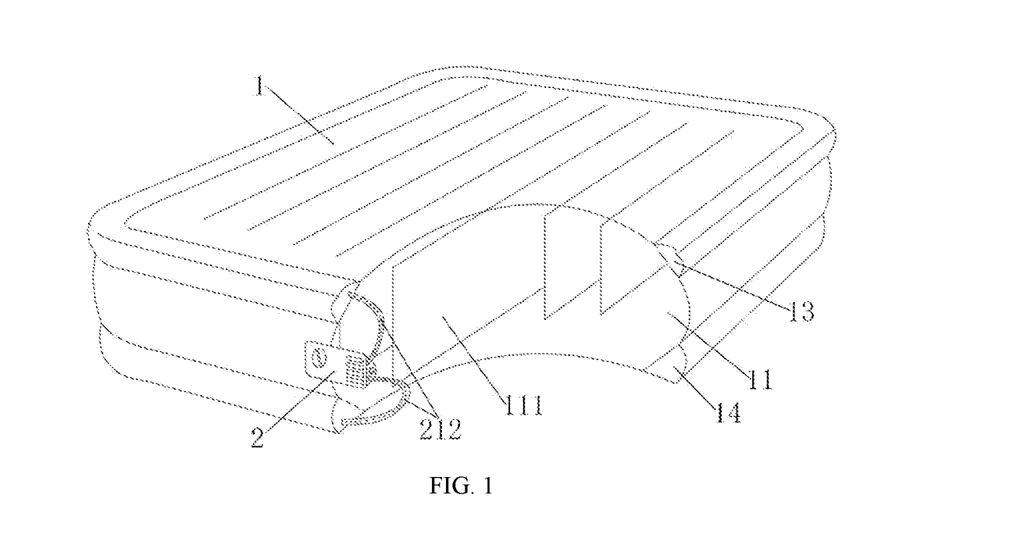
FIG. 1 is a structural schematic diagram of an airbed with an air pump according to an embodiment of the present invention.

The airbed with the air pump includes the airbed body 1, and the airbed body 1 can be made of a polyvinyl chloride (PVC) material. The main inflatable cavity 11 is arranged inside the airbed body 1, the top edge of the main inflatable cavity 11 is surrounded by the upper inflatable cavity 13, and the bottom edge of the main inflatable cavity 11 is surrounded by the lower inflatable cavity 14. The main inflatable cavity 11, the upper inflatable cavity 13 and the lower inflatable cavity 14 are isolated from each other. The sheet curtains 111 are arranged in the main inflatable cavity 11 at intervals, so that the upper and lower surfaces of the main inflatable cavity 11 after being fully filled with air are maintained to be flat. A side of the airbed body 1 is provided with the air pump 2, and the main inflatable cavity 11, the upper inflatable cavity 13 and the lower inflatable cavity 14 can be inflated through the air pump 2.

Figure 2:
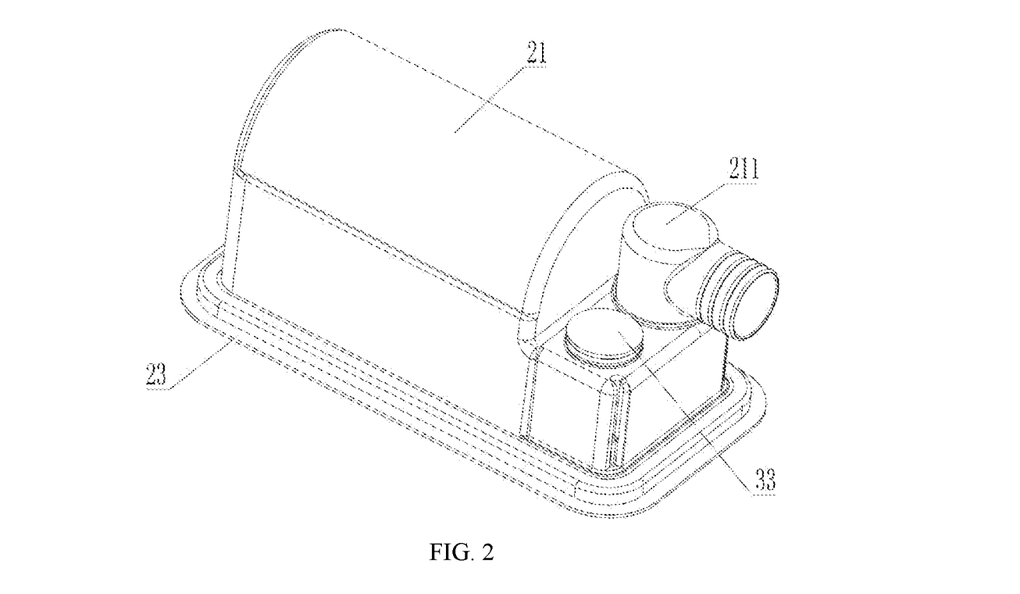
FIG. 2 is a first perspective structural schematic diagram showing the air pump of the airbed with the air pump according to one embodiment of the present invention.
Figure 3:
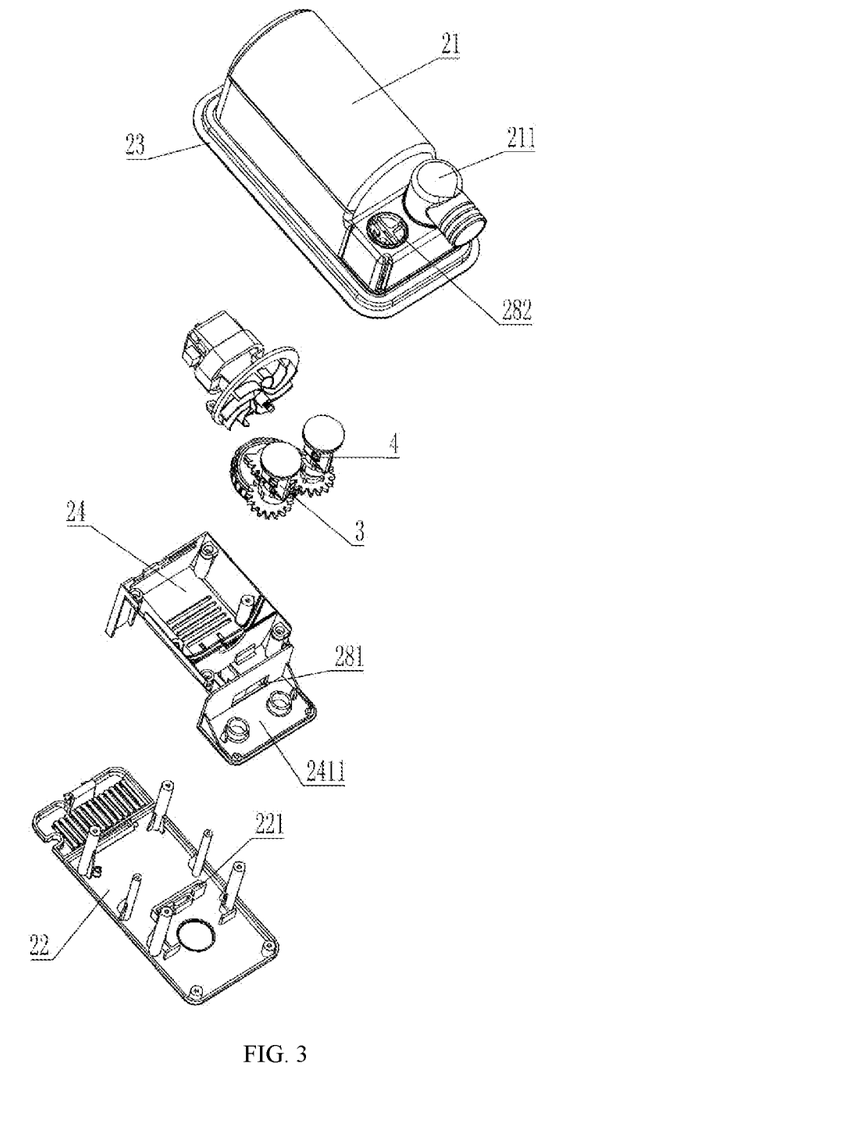
FIG. 3 is an exploded diagram showing the air pump of the airbed with the air pump according to an embodiment of the present invention.
Figure 4:
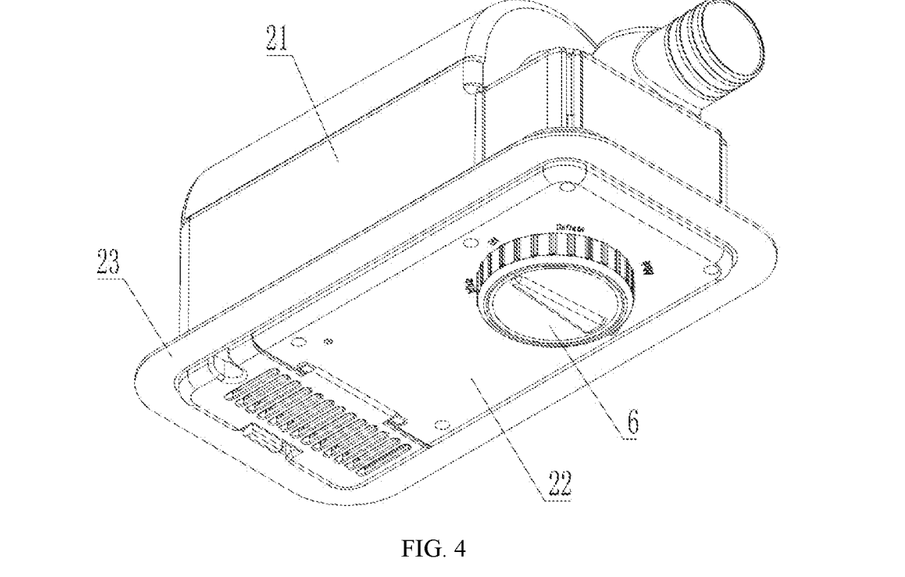
FIG. 4 is a second perspective structural schematic diagram showing the air pump of the airbed with the air pump according to an embodiment of the present invention.

As shown in FIGS. 2 and 3, the air pump 2 includes a housing, the housing includes the upper cover 21, and the bottom plate 22 is arranged at the bottom of the upper cover 21. The annular surrounding film 23 is arranged along the periphery of the bottom of the upper cover, and the annular surrounding film 23 is configured to be welded with the airbed body 1, so that the air pump 2 is located in the main inflatable cavity 11, and the bottom surface of the bottom plate 22 is exposed out. As shown in FIG. 4, the bottom surface of the bottom plate 22 is provided with the knob 6, which is configured to regulate the operation of the air pump 2.

As shown in FIG. 3, the first valve 3 and the second valve 4 are arranged in the air pump 2. Since the air pump 2 is located in the main inflatable cavity 11, after the first valve 3 is opened, the air pump 2 can be communicated with the main inflatable cavity 11 to directly inflate the main inflatable cavity 11. The top of the front side of the upper cover 21 is provided with the joint 211. As shown in FIG. 1, the joint 211 is communicated with the upper inflatable cavity 13 and the lower inflatable cavity 14 respectively through the inflatable pipe 212, so that after the second valve 4 is opened, the upper inflatable cavity 13 and the lower inflatable cavity 14 can be inflated.

In addition, the first valve 3 and the second valve 4 can be switched to an inflating position, a sealing position and an air discharge position, respectively. The air pump 2 is provided with a switching mechanism configured to control the first valve 3 and the second valve 4 to be switched between the inflating position, the sealing position and the air discharge position. Specifically, in the inflating position, the first valve 3 and the second valve 4 are opened, and the main inflatable cavity 11, the upper inflatable cavity 13 and the lower inflatable cavity 14 can be inflated in this case. In the sealing position, the first valve 3 and the second valve 4 are both closed, and the pressures of the main inflatable cavity 11, the upper inflatable cavity 13 and the lower inflatable cavity 14 are sustained. In the air discharge position, the first valve 3 and the second valve 4 are opened, and the air of the main inflatable cavity 11, the upper inflatable cavity 13 and the lower inflatable cavity 14 can be discharged in this case.

A motor chamber, an inflation chamber, a valve chamber and a ventilation chamber are formed inside the housing and isolated from each other.

Figure 5:
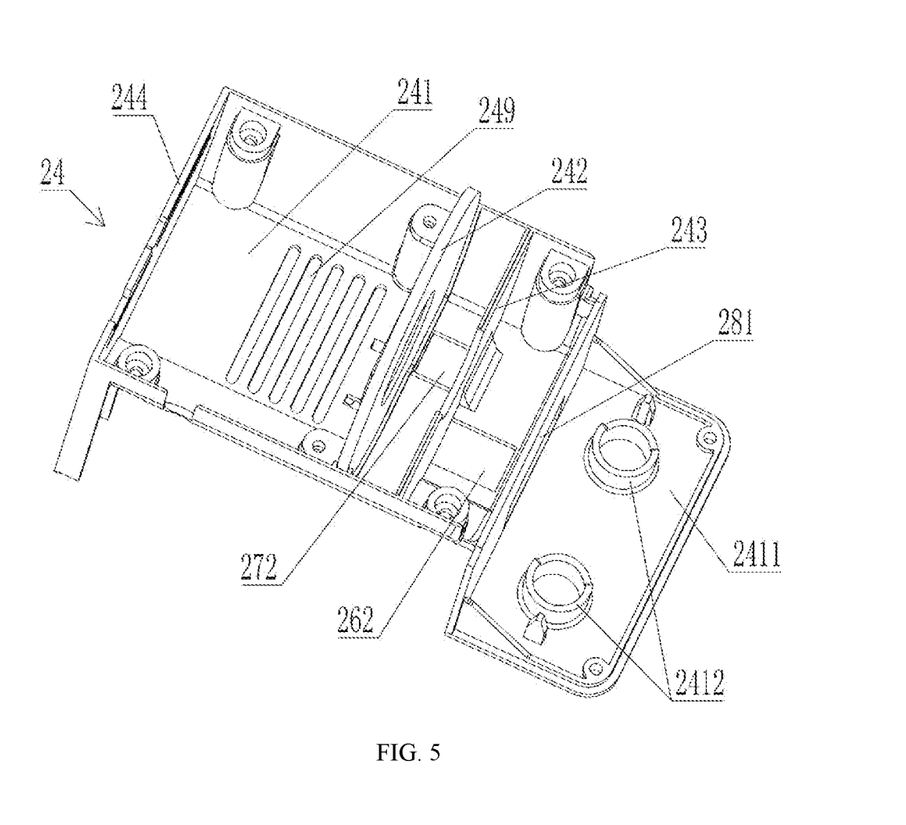
FIG. 5 is a structural schematic diagram showing an insolation frame of the air pump of the airbed with the air pump according to an embodiment of the present invention.
Figure 6:
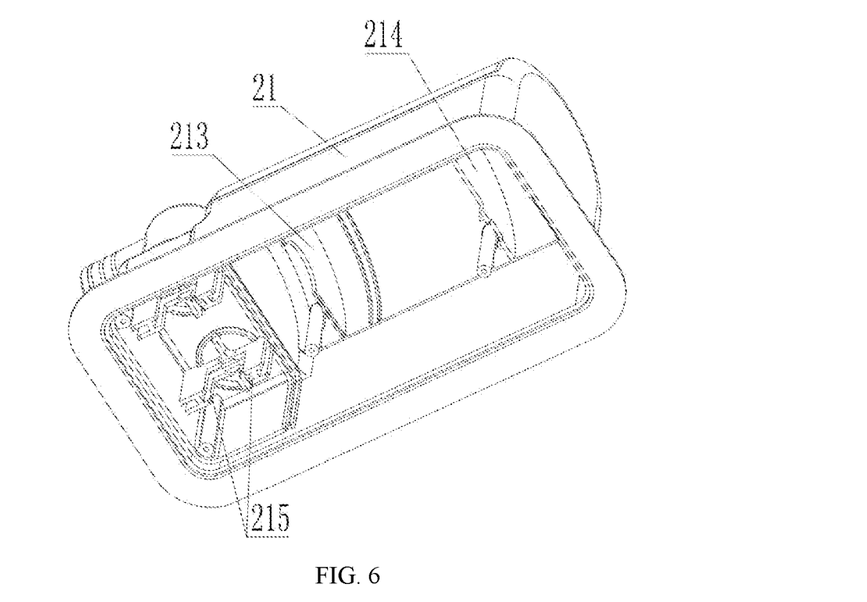
FIG. 6 is a structural schematic diagram showing an upper cover of the air pump of the airbed with the air pump according to an embodiment of the present invention.
Figure 7:
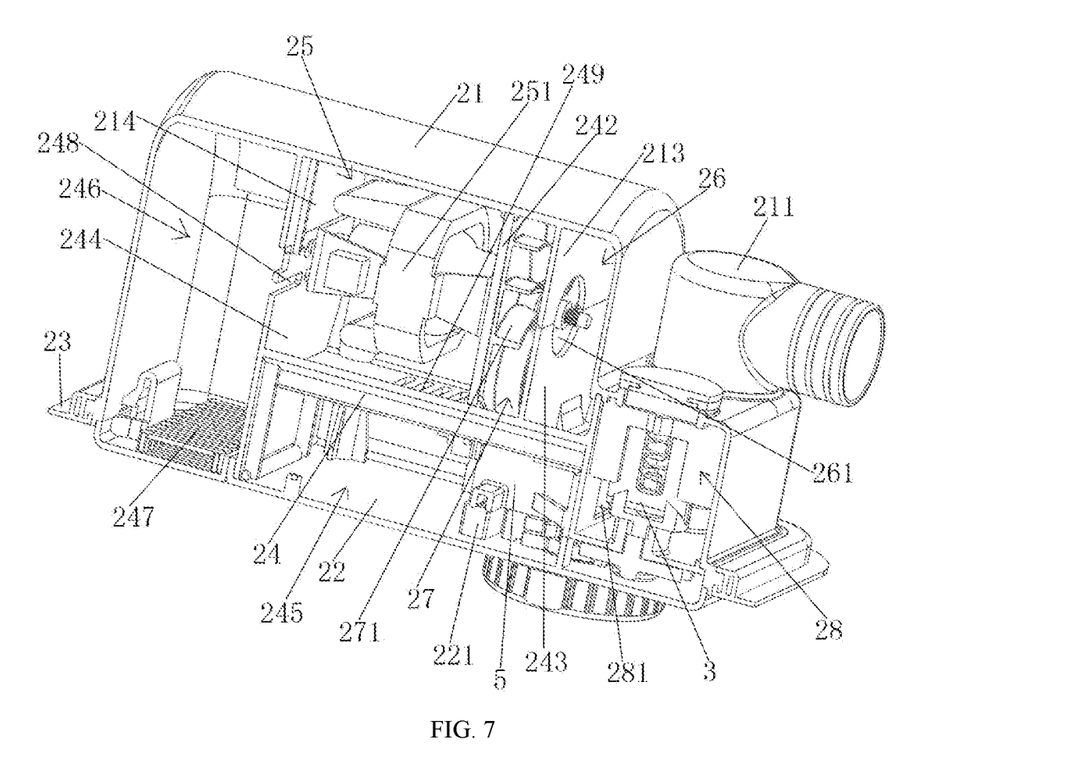
FIG. 7 is a schematic diagram showing an internal structure of the air pump of the airbed with the air pump according to an embodiment of the present invention.

Specifically, as shown in FIG. 2, the isolation frame 24 is arranged in the upper cover 21. As shown in FIG. 5, the isolation frame 24 includes the isolation groove 241, and the first isolation plate 242 is arranged in the isolation groove 241. The front portion and the back portion of the isolation groove 241 are provided with the first splicing plate 243 and the second splicing plate 244, respectively. As shown in FIG. 6, the front and back tops in the upper cover 21 are integrally provided with the third splicing plate 213 and the fourth splicing plate 214, respectively. Referring to FIG. 7, the first splicing plate 243 and the third splicing plate 213 are aligned and attached to form a second isolation plate, and the second splicing plate 244 and the fourth splicing plate 214 are aligned and attached to form a third isolation plate.

Specifically, the motor chamber 25 and the inflation chamber are located at the front and back sides of the first isolation plate 242, respectively, and the inflation chamber is divided by the second isolation plate into the front inflation chamber 26 and the back inflation chamber 27. The first communication hole 261 is arranged in the middle of the second isolation plate between the front inflation chamber 26 and the back inflation chamber 27, so that the front inflation chamber 26 and the back inflation chamber 27 are communicated with each other. The motor 251 and the blade 271 are arranged in the motor chamber 25 and the back inflation chamber 27, respectively, and the motor 251 is drivingly connected to the blade 271.

The ventilation chamber includes the lower ventilation chamber 245 located below the motor chamber 25 and the inflation chamber, and the back ventilation chamber 246 located at the back side of the motor chamber 25. The bottom of the back ventilation chamber 246 is provided with the fifth ventilation port 247, and the fifth ventilation port 247 is grid-shaped. The sixth ventilation port 248 is arranged between the back ventilation chamber 246 and the motor chamber 25, and the sixth ventilation port 248 includes a plurality of small holes located on the third isolation plate. The seventh ventilation port 249 is arranged between the motor chamber 25 and the lower ventilation chamber 245, and the seventh ventilation port 249 includes a plurality of holes arranged at the bottom of the isolation groove 241 of the isolation frame 24.

When the motor 251 is started, the external air flows through the fifth ventilation port 247, the sixth ventilation port 248 and the seventh ventilation port 249 in sequence into the lower ventilation chamber 245, which can play the role of heat dissipation for the motor 251.

The valve chamber 28 is located at the front sides of the lower ventilation chamber 245 and the front inflation chamber 26, and the first valve 3 and the second valve 4 are arranged in the valve chamber 28. As shown in FIG. 5, the bottom of the isolation groove 241 is provided with the first ventilation port 262 and the second ventilation port 272, respectively. The front inflation chamber 26 and the back inflation chamber 27 are communicated with the lower ventilation chamber 245 through the first ventilation port 262 and the second ventilation port 272, respectively. The back side of the valve chamber 28 is provided with the third ventilation port 281. As shown in FIG. 3, the front portion of the isolation groove 241 is integrally provided with the L-shaped holding plate 2411, and the third ventilation port 281 is arranged on the L-shaped holding plate 2411.

Figure 8:
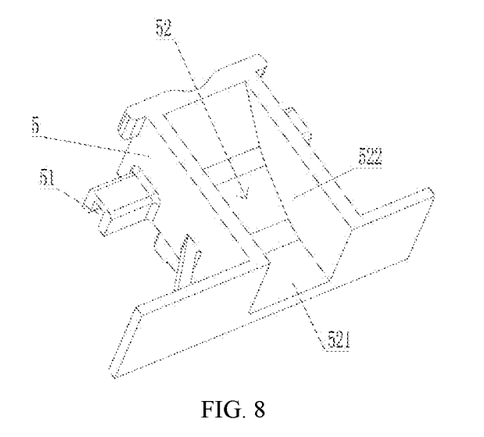
FIG. 8 is a first perspective structural schematic diagram showing a channel-switching slide block of the air pump of the airbed with the air pump according to an embodiment of the present invention.

As shown in FIG. 7, the channel-switching slide block 5 is arranged in the lower ventilation chamber 245, and the slide rail 221 is arranged on the bottom plate 22 of the housing. As shown in FIG. 8, the channel-switching slide block 5 is provided with the slide groove 51 matched with the slide rail 221, so that the channel-switching slide block 5 can be moved along the slide rail 221. The channel-switching slide block 5 is provided with the ventilation groove 52. The ventilation groove 52 is in a shape of a chute, and the ventilation groove 52 is provided with the front opening 521 and the top opening 522.

When the first valve 3 and the second valve 4 are in the inflating position, the front opening 521 is communicated with the third ventilation port 281, the channel-switching slide block 5 is moved to the bottom of the first ventilation port 262, and the top opening 522 is communicated with the first ventilation port 262. In this case, the second ventilation port 272 is communicated with the lower ventilation chamber 245, and under the action of the blade 271 driven by the motor 251, the air in the lower ventilation chamber 245 reaches the back inflation chamber 27 through the second ventilation port 272, then to reach the front inflation chamber 26 through the first communication hole 261, and then to reach the valve chamber 28 through the first ventilation port 262, the ventilation groove 52 and the third ventilation port 281. Next, the air in the valve chamber 28 enters the main inflatable cavity 11, the upper inflatable cavity 13 and the lower inflatable cavity 14 via the first valve 3 and the second valve 4.

When the first valve 3 and the second valve 4 are in the air discharge position, the channel-switching slide block 5 is moved to the bottom of the second ventilation port 272, the front opening 521 is communicated with the third ventilation port 281, the top opening 522 is communicated with the second ventilation port 272, and the first ventilation port 262 is communicated with the lower ventilation chamber 245, so that the air in the main inflatable cavity 11, the upper inflatable cavity 13 and the lower inflatable cavity 14 can be discharged.

Further, while adjusting the first valve 3 and the second valve 4, the switching mechanism can drive the channel-switching slide block 5 to move along the slide rail.

Figure 9:
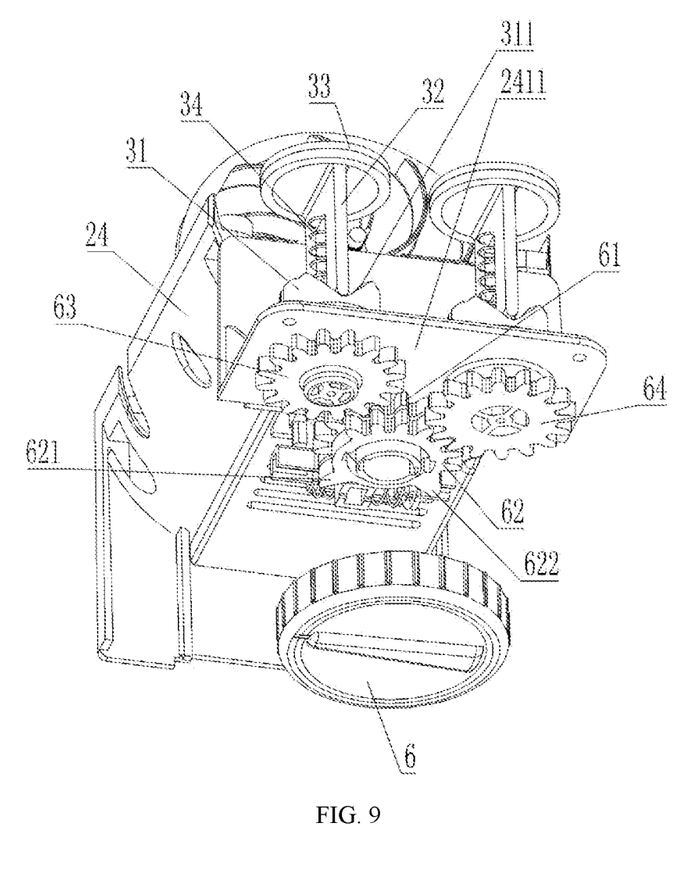
FIG. 9 is an installing schematic diagram showing a switching mechanism of the air pump of the airbed with the air pump according to one embodiment of the present invention.

As shown in FIG. 9, the switching mechanism includes the first gear 61 and the second gear 62 arranged coaxially, and the first gear 61 and the second gear 62 are stacked together. The switching mechanism further includes the third gear 63 engaged with the first gear 61, and the fourth gear 64 engaged with the second gear 62. The middle portion of the knob 6 is provided with a rotating shaft inserted in the middle portion of the first gear 61 and the second gear 62, and when the knob 6 is twisted, the first gear 61 and the second gear 62 can be rotated so that the third gear 63 and the fourth gear 64 can drive the first valve 3 and the second valve 4 to operate, respectively.

Specifically, as shown in FIG. 9, the first valve 3 includes the base 31 and the top plate 32, and the top of the top plate 32 is provided with the valve plate 33. As shown in FIG. 5, the L-shaped holding plate 2411 is provided with the installation seat 2412 for installing the first valve 3 and the second valve 4, and the base 31 is arranged on the installation seat 2412. As shown in FIG. 6, the guide groove 215 matched with the top plate 32 is arranged in the upper cover 21 of the housing, and the compressed spring 34 is arranged between the top plate 32 and the guide groove 215. A connecting shaft connected to the center of the third gear 63 is arranged under the base 31. The upper side of the base 31 is provided with the V-shaped groove 311, and the lower end of the top plate 32 is located in the V-shaped groove 311. When the knob 6 is twisted, the third gear 63 drives the base 31 to rotate by a certain angle, so that the top plate 32 can lift or lower in the V-shaped groove 311, thereby driving the valve plate 33 to lift or lower. As shown in FIG. 3, the valve chamber 28 is provided with the fourth ventilation port 282 corresponding to the valve plate 33, and the sealing ring is arranged on the bottom edge of the valve plate 33. When the valve plate 33 lifts, the fourth ventilation port 282 is opened, that is, the first valve 3 is opened. When the valve plate 33 lowers, the fourth ventilation port 282 is closed, that is, the first valve 3 is closed. The structure of the second valve 4 is identical to the structure of the first valve 3, thereby not described in detail here.

Figure 10:
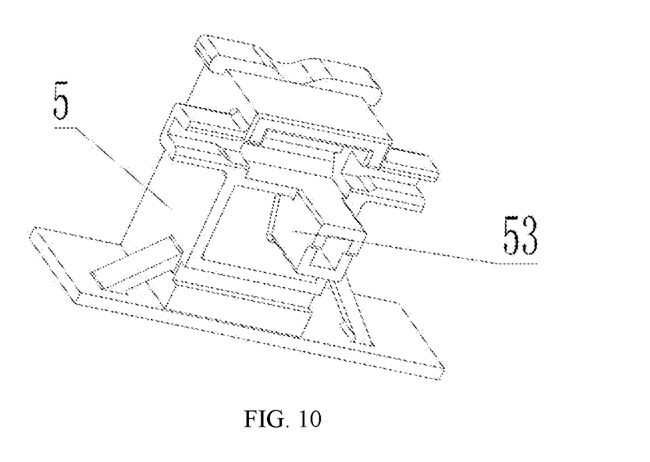
FIG. 10 is a second perspective structural schematic diagram showing the channel-switching slide block of the air pump of the airbed with the air pump according to one embodiment of the present invention.

Further, the first dial tooth 621 and the second dial tooth 622 are arranged at an interval at the back side of the first gear 61 and the second gear 62. As shown in FIG. 10, the bottom of the channel-switching slide block 5 is provided with the upright rod portion 53 located between the first dial tooth 621 and the second dial tooth 622, so that when the knob 6 is twisted, the first dial tooth 621 or the second dial tooth 622 can drive the channel-switching slide block 5 to move along the slide rail 221.

Although the embodiments of the present invention have been shown and described, it is understandable for those having ordinary skill in the art that these embodiments may be changed, revised, replaced, and modified without departing from the principle and spirit of the present invention, and the scope of the present invention is limited and defined by the appended claims and the equivalents thereof.

What is claimed is:

1. An airbed, comprising an airbed body and an air pump arranged on a side of the airbed body, wherein
a main inflatable cavity is arranged inside the airbed body, a top edge of the main inflatable cavity is surrounded by an upper inflatable cavity, and a bottom edge of the main inflatable cavity is surrounded by a lower inflatable cavity;
the main inflatable cavity, the upper inflatable cavity and the lower inflatable cavity are isolated from each other;
a first valve and a second valve are arranged in the air pump, the first valve is allowed to be communicated with the main inflatable cavity, and the second valve is communicated with the upper inflatable cavity and the lower inflatable cavity respectively through an inflatable pipe;
the first valve and the second valve are allowed to be switched to an inflating position, a sealing position, and an air discharge position, respectively;
the air pump is provided with a switching mechanism configured to control the first valve and the second valve to be switched between the inflating position, the sealing position and the air discharge position, wherein in the inflating position, the first valve and the second valve are opened; in the sealing position, the first valve and the second valve are closed; and in the air discharge position, the first valve and the second valve are opened;
the air pump comprises a housing, wherein a motor chamber, an inflation chamber, a valve chamber, and a ventilation chamber are formed inside the housing and isolated from each other; the inflation chamber is divided into a front inflation chamber and a back inflation chamber; a first communication hole is arranged between the front inflation chamber and the back inflation chamber;
a motor and a blade are arranged in the motor chamber and the back inflation chamber, respectively, and the motor is drivingly connected to the blade; the first valve and the second valve are arranged in the valve chamber;
a channel-switching slide block is arranged in the ventilation chamber, and a slide rail is arranged in the housing; the channel-switching slide block is provided with a slide groove matched with the slide rail, and the channel-switching slide block is allowed to be driven to move along the slide rail when the switching mechanism adjusts the first valve and the second valve;
the front inflation chamber and the back inflation chamber are respectively provided with a first ventilation port and a second ventilation port communicated with the ventilation chamber, and the valve chamber is provided with a third ventilation port; and
the channel-switching slide block is provided with a ventilation groove, and the ventilation groove is provided with a front opening and a top opening; when the first valve and the second valve are in the inflating position, the front opening is communicated with the third ventilation port and the top opening is communicated with the first ventilation port; when the first valve and the second valve are in the air discharge position, the front opening is communicated with the third ventilation port and the top opening is communicated with the second ventilation port.

2. The airbed according to claim 1, wherein the switching mechanism comprises a first gear and a second gear arranged coaxially, a third gear engaged with the first gear, and a fourth gear engaged with the second gear; wherein
- a knob is arranged outside the housing to drive the first gear and the second gear to rotate, and the third gear and the fourth gear are allowed to drive the first valve and the second valve to operate, respectively;
- a first dial tooth and a second dial tooth are arranged at an interval at a back side of the first gear or/and a back side of the second gear; a bottom of the channel-switching slide block is provided with an upright rod portion located between the first dial tooth and the second dial tooth.

3. The airbed according to claim 2, wherein the first valve comprises a base and a top plate, wherein
- a top of the top plate is provided with a valve plate; the valve chamber is provided with a fourth ventilation port corresponding to the valve plate, a guide groove matched with the top plate is arranged in the housing, and a compressed spring is arranged between the top plate and the guide groove; a connecting shaft connected to a center of the third gear is arranged under the base; an upper side of the base is provided with a V-shaped groove, and a lower end of the top plate is located in the V-shaped groove.

4. The airbed according to claim 3, wherein a structure of the second valve is identical to a structure of the first valve.

5. The airbed according to claim 1, wherein
- the inflation chamber is located at a front side of the motor chamber;
- the ventilation chamber comprises a lower ventilation chamber located below the motor chamber and the inflation chamber, and a back ventilation chamber located at a back side of the motor chamber;
- the valve chamber is located at a front side of the lower ventilation chamber and a front side of the inflation chamber; a bottom of the back ventilation chamber is provided with a fifth ventilation port; a sixth ventilation port is arranged between the back ventilation chamber and the motor chamber; and a seventh ventilation port is arranged between the motor chamber and the lower ventilation chamber.

6. The airbed according to claim 5, wherein the housing comprises an upper cover, a bottom plate is arranged at a bottom of the upper cover, and an annular surrounding film is arranged along a periphery of the bottom of the upper cover;
- an isolation frame is arranged in the upper cover, the isolation frame comprises an isolation groove, and a first isolation plate is arranged in the isolation groove; the motor chamber and the inflation chamber are located at a front side of the first isolation plate and a back side of the first isolation plate, respectively;
- a front portion of the isolation groove and a back portion of the isolation groove are provided with a first splicing plate and a second splicing plate, respectively, and a front top and a back top in the upper cover are integrally provided with a third splicing plate and a fourth splicing plate, respectively; the first splicing plate and the third splicing plate are aligned and attached to form a second isolation plate, and the second splicing plate and the fourth splicing plate are aligned and attached to form a third isolation plate;
- the inflation chamber is divided by the second isolation plate into the front inflation chamber and the back inflation chamber;
- the back ventilation chamber is located at a back side of the third isolation plate, and the lower ventilation chamber is located at a lower side of the isolation groove; and
- the front portion of the isolation groove is integrally provided with an L-shaped holding plate, and the L-shaped holding plate is provided with an installation seat for installing the first valve and the second valve.

* * * * *